July 21, 1925.
T. BOLLY
1,547,017
HOPPER SUPPORTING FRAME
Filed Nov. 3, 1922
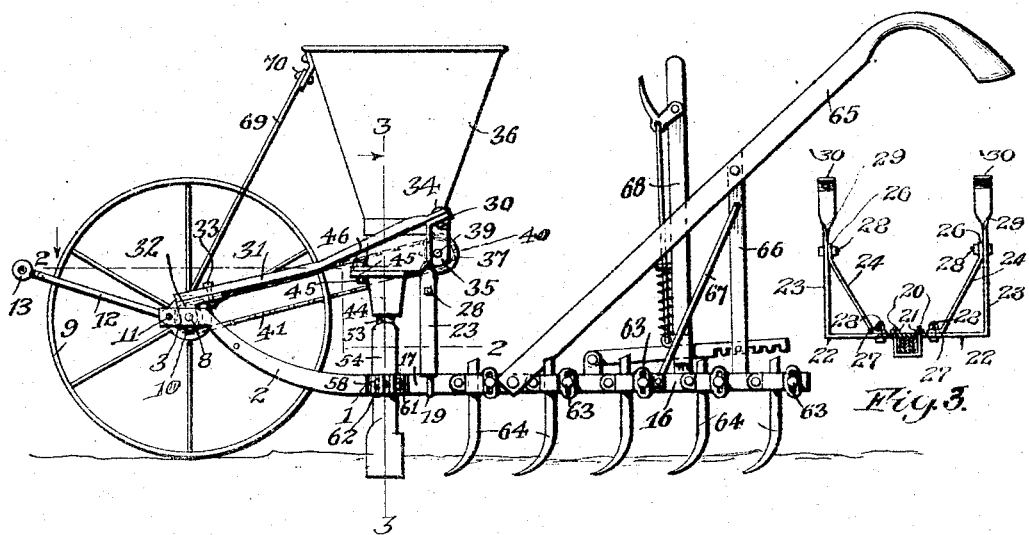
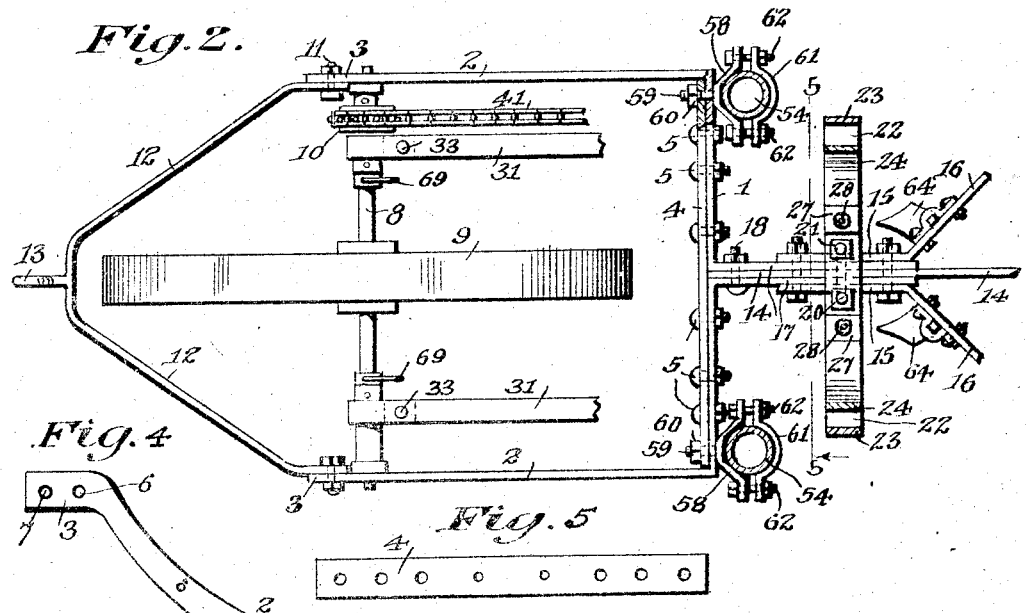

Patented July 21, 1925.

1,547,017

UNITED STATES PATENT OFFICE.

TREUMUND BOLLY, OF SANFORD, FLORIDA.

HOPPER-SUPPORTING FRAME.

Application filed November 3, 1922. Serial No. 598,840.

*To all whom it may concern:*

Be it known that I, TREUMUND BOLLY, a citizen of Switzerland, residing at Sanford, in the county of Seminole and State of Florida, have invented new and useful Improvements in Hopper-Supporting Frames, of which the following is a specification.

This invention relates to a combined fertilizer distributor, drill and cultivator, and has for its object to provide in a manner as hereinafter set forth, a ground working machine of such class, for successively barring or furrowing the ground, depositing the fertilizer in the furrows, and then covering up these latter and mixing and distributing the fertilizer, at the same time cultivating between the rows of growing crops, under such conditions, providing a single machine for carrying out the several operations referred to.

Further objects of the invention are to provide a combined fertilizer distributor, drill and cultivator, which is comparatively simple in its construction, strong, durable, adjustable, readily assembled, efficient and convenient in its use, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention. It is to be understood that changes, variations and modifications can be resorted to, which fall within the scope of the claim hereunto appended.

In the drawings wherein like reference characters denote corresponding parts throughout the several views:—

Figure 1 is a side elevation of a combined fertilizer distributor, drill and cultivator in accordance with this invention.

Fig. 2 is a top plan view thereof, broken away,

Fig. 3 is an elevation of the hopper support,

Fig. 4 is a side view of one of the arms of the frame forming the body portion of the machine, Fig. 5 is a view of a reinforcing bar and board in connection with the frame of the machine.

Referring to the drawings in detail, the body portion of the machine is in the form of a frame consisting of a pair of oppositely disposed angle-shaped frame sections including an L-shaped rear portion 1, formed of a horizontal arm and a longitudinal arm and with the longitudinal arm projecting rearwardly from the horizontal arm, an upwardly curved intermediate portion 2, terminating in a forward terminal portion 3 positioned above the L-shaped rear portion 1. The intermediate portion 2 of the frame section projects from the outer end of the horizontal arm of the L-shaped rear portion 1. The L-shaped rear portions of the frame sections are connected together by a reinforcing bar 4, arranged against the forward faces of the horizontal arms of said L-shaped portions of the frame sections and the bar 4. The bar 4 and the horizontal arms of said L-shaped rear portions of the frame sections, are secured together by hold fast devices 5. The forward end portion terminal 3 of each of the frame sections is provided with a pair of openings 6, 7, and mounted in the openings 6, is an axle 8, provided with a track wheel 9, and also with a sprocket wheel 10. Extending through the opening 7, are hold fast devices 11, for connecting a bail 12 to the frame sections. The bail 12 has a clevis 13, to which an animal may be coupled for the purpose of dragging the machine, or the clevis 13 can be connected to any suitable traction device.

Positioned between the longitudinally extending arms of the L-shaped rear portions of the frame sections, is a supporting member 14, which projects rearwardly from the body portion of the machine, and arranged against each longitudinal arm of the L-shaped rear portions 1, is the forward terminal portion 15, of a rearwardly extending and outwardly inclined cultivator bar 16. The longitudinal arms of the rear end portions of the frame sections are secured to the supporting member 14 and forward terminals 15, of the cultivator bars, by the hold fast devices 17, and the said longitudinal arms are also secured to the supporting member 14, by the hold fast device 18.

Mounted on the longitudinal arms of the rear L-shaped end portions of the frame sections, the forward end terminals of the cultivator bar 16 and the supporting member 14, is a hopper support, which is secured in position by a yoke 19, which surrounds said longitudinal arms and forward end terminals 15 of the cutter bars, and said yoke 19 has each of its arms threaded as at 20, and provided with securing nuts 21. The hopper support is formed from a vertically disposed U-shaped frame, consisting of a base member 22, a pair of side members or arms 23, and a pair of brace members 24. The arms of the yoke 19, extend through the base member 22, and the nuts 21 bear against the upper face of the base member 22. The brace members 24 are flanged as at 26, 27, and the flanges 26 are secured to the side members 23 of the hopper support and the flanges 27 are secured to the base member 22 of the hopper support.

Hold fast devices 28 are provided for securing the flanges of the brace members to the side and base members of the hopper support. The upper portion of each of the side members or arms 23 is torsionally twisted as at 29, and the upper part of each of the torsionally twisted portions is bent rearwardly at an inclination to provide an inclined flange 30. Projecting forwardly from the inclined flanges 30 of the side members 23, is a pair of downwardly inclined supporting arms 31, which have their forward ends secured to coupling members 32, carried by the axle 8. Hold fast devices 33 are provided for securing the supporting members or arms 31 to the coupling members 32. The rear end of each of the arms or supporting members 31, is connected to a flange 30, by a hold fast device 34. Depending from the rear end of each of the arms or supporting members 31, is a hanger 35. Positioned between, as well as connected with the hangers 35 is a hopper 36.

The hopper 36, opens into a drill head 44, secured to the bottom of the hopper 36, by hold fast devices 45, which extend through the flanges 46, projecting forwardly from the hopper and drill head.

Depending from the drill head 44, is a pair of oppositely extending and outwardly inclined nipples 53, only one of which is shown.

Each drill tube 54 is positioned against a clamping element 58, and the latter is carried by a threaded bar 59, which extends through the rear of the frame section. The bars 59 are provided with holding nuts 60, which bear against the reinforcing bar 4. Positioned against each of the tubes 54, is a clamping member 61, which is secured to a clamping member 58, by the hold fast devices 62, and by this arrangement, the drill tubes are clamped in position at an inclination, to the body portion of the machine.

Each of the cultivator bars 16, has connected therewith, by the securing devices 63, a plurality of cultivator teeth 64. Projecting rearwardly from the cultivator bars 16 and upwardly at an inclination, are handle members 65, to which are attached vertical supports 66, these latter being provided with brace members 67.

A lever adjusting mechanism of known type, as indicated at 68, is connected with the bars 16, and supporting member 14, and as this device is of the well known type, it is thought unnecessary to specifically describe the same.

Brace members 69 are secured to the hopper as at 70, and extend to the coupling members 32.

The machine can be drawn by an animal, or connected up to any suitable traction means, and can also be adjusted to any desirable height.

Owing to the manner in which the machine is set up, it can be employed in the manner as hereinbefore stated, but if desired, it can be disassembled and the cultivator used separately, or the fertilizer distributor used separately.

Although the preferred embodiment of the invention is that as described and illustrated in the accompanying drawings, it is to be understood however that changes in the details of construction can be made without departing from the spirit of the invention as claimed.

What is claimed is:—

A machine for the purpose set forth comprising an axle, a body portion having means at its forward end for connecting the axle therewith, a vertically disposed U-shaped frame having its base connected to the rear of said body portion and constituting a hopper support, said frame including a pair of side arms each formed with a torsionally twisted upper terminal portion, the upper part of each torsionally twisted portion bent rearwardly at an angle to provide a rearwardly extending and upwardly inclined flange, base members connected to the base and to the side arms of said frame below said torsionally twisted upper terminal portions of the side arms, and forwardly extending and downwardly inclined supporting members secured at their rear ends to the upper faces of said flanges and their forward ends connected with the axle.

In testimony whereof, I affix my signature hereto.

TREUMUND BOLLY.